US012452590B2

(12) United States Patent
Wichern et al.

(10) Patent No.: US 12,452,590 B2
(45) Date of Patent: Oct. 21, 2025

(54) METHOD AND SYSTEM FOR SOUND EVENT LOCALIZATION AND DETECTION

(71) Applicant: Mitsubishi Electric Research Laboratories, Inc., Cambridge, MA (US)

(72) Inventors: Gordon Wichern, Cambridge, MA (US); Olga Slizovskaia, Cambridge, MA (US); Jonathan Le Roux, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 624 days.

(21) Appl. No.: 17/687,866

(22) Filed: Mar. 7, 2022

(65) Prior Publication Data

US 2023/0283950 A1 Sep. 7, 2023

(51) Int. Cl.
*H04R 3/00* (2006.01)
*G06N 3/08* (2023.01)
*H04R 1/40* (2006.01)

(52) U.S. Cl.
CPC .............. *H04R 3/005* (2013.01); *G06N 3/08* (2013.01); *H04R 1/406* (2013.01); *H04R 2201/401* (2013.01)

(58) Field of Classification Search
None
See application file for complete search history.

(56) References Cited

U.S. PATENT DOCUMENTS

| | | | | |
|---|---|---|---|---|
| 11,508,351 B2 * | 11/2022 | Zhang | ................ | G10L 21/0208 |
| 11,915,698 B1 * | 2/2024 | Lee | .................... | G10L 15/08 |
| 2007/0233321 A1 * | 10/2007 | Suzuki | ................. | G05D 1/0255 |
| | | | | 700/245 |
| 2014/0072142 A1 * | 3/2014 | Nakadai | ................ | G01S 3/8083 |
| | | | | 381/92 |
| 2018/0286411 A1 * | 10/2018 | Nakadai | .................. | G10L 17/00 |
| 2020/0066023 A1 * | 2/2020 | Nakadai | .................. | G10L 25/51 |
| 2021/0258712 A1 * | 8/2021 | Lyren | ..................... | H04R 5/033 |
| 2022/0223170 A1 * | 7/2022 | Sun | ......................... | H04R 1/406 |
| 2022/0295176 A1 * | 9/2022 | Eswara | ................. | G06F 18/214 |
| 2023/0164509 A1 * | 5/2023 | Sporer | .................... | H04S 3/008 |
| | | | | 381/309 |

(Continued)

OTHER PUBLICATIONS

Ochiai T, Delcroix M, Koizumi Y, Ito H, Kinoshita K, Araki S. Listen to what you want: Neural network-based universal sound selector. arXiv preprint arXiv:2006.05712. Jun. 10, 2020. (Year: 2020).*

(Continued)

*Primary Examiner* — Jonathan C Kim
(74) *Attorney, Agent, or Firm* — Gene Vinokur

(57) ABSTRACT

Embodiments of the present disclosure disclose a system and method for localization of a target sound event. The system collects a first digital representation of an acoustic mixture of sounds of a plurality of sound events, by using an acoustic sensor. The system receives a second digital representation of a sound corresponding to the target sound event. Further, the first digital representation and the second digital representation are processed by a neural network to produce a localization information indicative of a location of an origin of the target sound event with respect to a location of the acoustic sensor.

19 Claims, 16 Drawing Sheets

(56) References Cited

U.S. PATENT DOCUMENTS

| | | | | |
|---|---|---|---|---|
| 2023/0283950 | A1* | 9/2023 | Wichern | H04R 3/005 |
| | | | | 381/92 |
| 2023/0326478 | A1* | 10/2023 | Wichern | G06N 3/08 |
| 2024/0055012 | A1* | 2/2024 | Wang | G10L 21/0232 |
| 2024/0129666 | A1* | 4/2024 | Ochiai | H04R 1/083 |

OTHER PUBLICATIONS

Meseguer-Brocal G, Peeters G. Conditioned-U-Net: Introducing a control mechanism in the U-Net for multiple source separations. arXiv preprint arXiv:1907.01277. Jul. 2, 2019. (Year: 2019).*

Schulze-Forster K, Doire C, Richard G, Badeau R. Weakly informed audio source separation. In2019 IEEE Workshop on Applications of Signal Processing to Audio and Acoustics (WASPAA) Oct. 20, 2019 (pp. 273-277). IEEE. (Year: 2019).*

Cao Y, Iqbal T, Kong Q, An F, Wang W, Plumbley MD. An improved event-independent network for polyphonic sound event localization and detection. InICASSP 2021-2021 IEEE International Conference on Acoustics, Speech and Signal Processing (ICASSP) Jun. 6, 2021 (pp. 885-889). IEEE. (Year: 2021).*

Seetharaman P, Wichern G, Venkataramani S, Le Roux J. Class-conditional embeddi7ngs for music source separation. InICASSP 2019-2019 IEEE International Conference on Acoustics, Speech and Signal Processing (ICASSP) May 12, 2019 (pp. 301-305). IEEE. (Year: 2019).*

Shimada K, Koyama Y, Takahashi S, Takahashi N, Tsunoo E, Mitsufuji Y. Multi-ACCDOA: Localizing and Detecting Overlapping Sounds from the Same Class with Auxiliary Duplicating Permutation Invariant Training. arXiv e-prints. Oct. 2021:arXiv-2110. (Year: 2021).*

Slizovskaia O, Haro G, Gómez E. Conditioned source separation for musical instrument performances. IEEE/ACM Transactions on Audio, Speech, and Language Processing. May 20, 2021;29:2083-95. (Year: 2021).*

Slizovskaia O, Wichern G, Wang ZQ, Le Roux J. Locate this, not that: Class-conditioned sound event doa estimation. InICASSP 2022-2022 IEEE International Conference on Acoustics, Speech and Signal Processing (ICASSP) May 23, 2022 (pp. 711-715). IEEE. (Year: 2022).*

Lee S, Yang H, Choi H, Seong W. Zero-shot single-microphone sound classification and localization in a building via the synthesis of unseen features. IEEE Transactions on Multimedia. May 13, 2021;24:2339-51.) (Year: 2021).*

S. Adavanne, A. Politis, J. Nikunen, and T. Virtanen, "Sound Event Localization and Detection of Overlapping Sources using Convolutional Recurrent Neural Networks," IEEE Journal on Selected Topics in Signal Processing, vol. 13, No. 1, pp. 34-48, 2019.

K. Shimada, Y. Koyama, N. Takahashi, S. Takahashi, and Y. Mitsufuji, "ACCDOA: Activity-coupled cartesian direction of arrival representation for sound event localization and detection," in Proc. ICASSP, 2021, pp. 915-919.

Perez, Ethan, et al. "Film: Visual reasoning with a general conditioning layer." Proceedings of the AAAI Conference on Artificial Intelligence. vol. 32. No. 1. 2018.

* cited by examiner

METHOD AND SYSTEM FOR SOUND EVENT LOCALIZATION AND DETECTION

TECHNICAL FIELD

This disclosure generally relates to sound event localization and detection (SELD), and more specifically to a sound event localization and detection system for estimation of direction of arrival of a sound event.

BACKGROUND

Existing systems for SELD typically operate by estimating a source location for all classes at every time instant. However, SELD remains challenging because sound sources can move, cease to produce sound, have their positions obscured by room reverberation, and are often mixed with interfering sounds. Furthermore, many sound events are easily confused, further complicating the SELD task.

It has been felt that estimating localization information for sound, specifically the direction of arrival (DOA) of the sound and also classifying the type of event taking place at the origin of the sound is an important type of frontend processing used in monitoring and robotic applications. Some existing SELD systems follow a pipeline of two main stages. The first stage extracts spectral and spatial features of the received sound from the microphone array. In the second stage, a deep neural network (DNN) is used to learn mapping from the multichannel input features to two output targets: (1) a vector of class probabilities indicating the presence of each class in each time instance; and (2) a DOA vector containing location information for each class. In this case, DNN training is challenging as the contributions from the two output branches must be balanced.

Some existing SELD systems including those based on activity coupled Cartesian direction of arrival (ACCDOA) representation, typically assume a small, fixed set of sound event classes to detect and localize. In practice, if there are 12 classes, this means a DNN will output 12 ACCDOA representations at each time instant. This approach may become impractical for large number of classes, and, in certain situations, localizing all classes all of the time may not be required.

To that end, training a class-specific system to localize only sound events from a single class would allow focusing on specific classes. However, it may be difficult to train class-specific models, as there may not be enough data available for each class of interest to properly train each and every model.

Accordingly, there exists a need for an SELD system that overcomes the above-stated disadvantages.

To that end, there is a need for a technical solution to overcome the above-mentioned challenges. More specifically, there is need for such an SELD system that outperforms conventional sound event detection and localization in the presence of directional interferences.

SUMMARY

The present disclosure provides a class conditioned SELD system for sound event localization. As discussed previously, existing systems for SELD typically operate by estimating a source location for all classes at every time instant. However, SELD remains challenging because sound sources can move, cease to produce sound, have their positions obscured by room reverberation, and are often mixed with interfering sounds. In addition, many sound events are easily confused, further complicating the SELD task.

Some embodiments are based on a realization that in the present SELD systems, there is only a single ACCDOA vector output at each time instant, and the class represented by this output is determined based on an input describing the type of sound event that needs to be located. Existing SELD systems including those based on the ACCDOA representation, typically assume a small, fixed set of sound event classes to detect and localize. For example, 12 classes will output 12 ACCDOA representations at each time instant.

Some embodiments are based on a recognition that outputting one ACCDOA representation for each class may become impractical for large number of classes, and, in certain situations, localizing all classes all of the time may not be required. To that end, training a class-specific system to localize only sound events from a single class would allow focusing on specific classes. However, it may be difficult to train class-specific models, due to extremely large training data requirements for each class of interest to properly train each and every model.

To that end, various embodiments provided herein provide a method and a system to localize sound events from a single target class and identify the target source based on the localized sound events.

Some embodiments are based on the realization that the SELD system may be trained as a class-specific system to localize sound events from a single class and identify the target sound event based on the localized sound events. The SELD system is further utilized for estimation of DOA of the target sound event and a distance between the origin of the target sound event and the source of sound. To that end, the SELD system collects a first digital representation of an acoustic mixture sensed by an acoustic sensor. The acoustic mixture is associated with a plurality of sound events. The SELD system further receives a second digital representation of a sound corresponding to the target sound event. The second digital representation is utilized for identifying the target sound event out of the plurality of sound events. The first digital representation and the second digital representation are processed by a neural network. The neural network is trained to produce a localization information indicative of a location of an origin of the target sound event with respect to a location of the acoustic sensor. In this manner, the neural network identifies the target sound event interfered with other sounds in the acoustic mixture.

Some embodiments are based on the realization that the SELD system of the present disclosure is configured to determine the DOA and a distance between the origin of the target sound event and the acoustic sensor. The DOA and the distance is determined by processing the first digital representation and the second digital representation with a DNN. The DNN is trained for considering sound events of the plurality of sound events other than the identified target sound event as directional interferences. The SELD system further outputs the DOA and the distance of the identified target sound event.

To that end, the first digital representation corresponds to representation of spatial and spectral features of the acoustic mixture. The second digital representation includes one or more exemplar waveform representations indicative of one or a combination of spatial characteristics, spectral characteristics, or class information of the target sound event. In addition, the second digital representation corresponds to a one-hot vector indicative of a sound event type of the target sound event among a predetermined set of sound event types. Further, the second digital representation includes one or more exemplar waveform representations indicative of one or a combination of spatial characteristics, spectral characteristics, or class information of the target sound event.

The SELD system is further configured to assign a one-hot vector indicating the target class of the plurality of classes to the identified target sound event. Additionally, the SELD system utilizes a class conditioned SELD network to determine the DOA and the distance of the identified target sound event. The class conditioned SELD network comprises at least one FiLM block that is directed to one or more convolution blocks. The at least one FiLM block and the one or more convolution blocks are trained to identify the target sound event and estimate the DOA and the distance from source of the identified target sound event.

Accordingly, one embodiment discloses a method implemented by a computer for localization of a target sound event. The method includes collecting a first digital representation of an acoustic mixture of sounds of a plurality of sound events sensed by the acoustic sensor. The method further includes receiving a second digital representation of the sound corresponding to the target sound event. The first digital representation and the second digital representation are processed with a neural network trained to produce a localization information indicative of a location of an origin of the target sound event with respect to a location of the acoustic sensor. The neural network identifies the target sound event interfered with other sounds in the acoustic mixture. The localization information of the origin of the target sound event is then outputted. The localization information includes a DOA of the target sound event from its origin toward the acoustic sensor and a distance between the origin of the target sound event and the acoustic sensor of the sound.

Various embodiments disclosed herein provide an SELD system that can more accurately, efficiently and in a reduced time, determine localization information associated with the target sound event, even when enough training data is not available.

Further features and advantages will become more readily apparent from the following detailed description when taken in conjunction with the accompanying drawings.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure. Contemplated are various changes that may be made in the function and arrangement of elements without departing from the spirit and scope of the subject matter disclosed as set forth in the appended claims.

As used in this specification and claims, the terms "for example," "for instance," and "such as," and the verbs "comprising," "having," "including," and their other verb forms, when used in conjunction with a listing of one or more components or other items, are each to be construed as open ended, meaning that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

System Overview

Figure 1A:
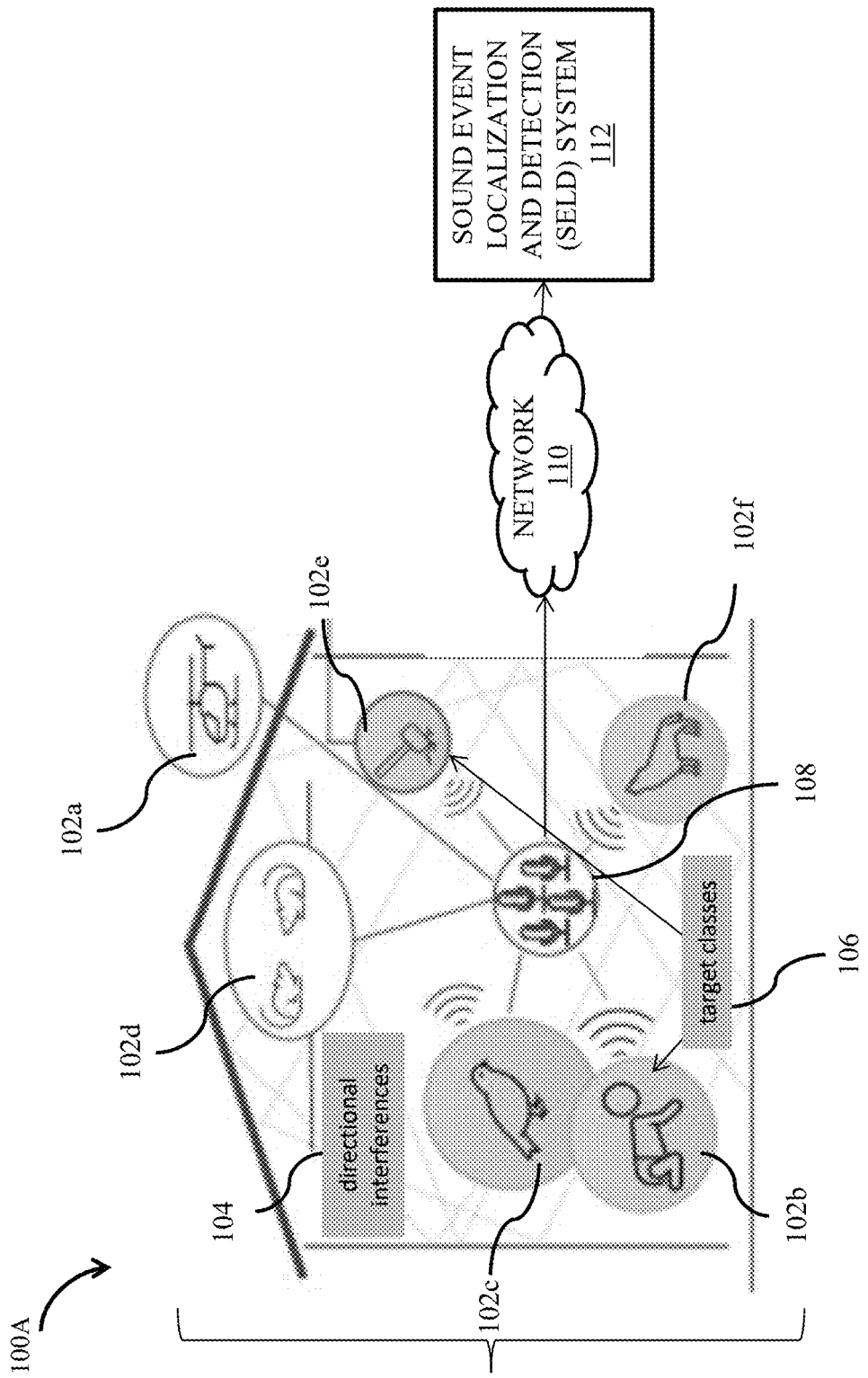
FIG. 1A shows a block diagram representation of an environment for estimation of a direction of arrival and a direction of arrival (DOA) of one or more target sound events, according to some embodiments of the present disclosure.

FIG. 1A illustrates a representation of an environment 100a for estimation of localization information including a direction of arrival and a distance of arrival of one or more target sound events, according to an embodiment of the present disclosure. The environment 100a includes a plurality of sound events 102. The plurality of sound events 102 includes but not be limited to sound of an airplane 102a, sound of a crying baby 102b, sound of chirping of birds 102c, sound of rats 102d, sound of hammer 102e, and sound of barking dog 102f. The environment 100a corresponds to an enclosed environment with an acoustic sensor 108. The acoustic sensor 108 is connected with a sound event localization and detection (SELD) system 112 through a network 110.

In an illustrative example scenario, the plurality of sound events 102 travel towards the SELD system 112 in different paths along with directional interferences 104. Generally, directional interferences 104 are caused when sound sources that are not required to be localized produce sounds that clash with the plurality of sound events 102. The acoustic sensor 108 captures the acoustic mixture comprising data associated with the plurality of sound events. When acoustic mixture reaches the acoustic sensor 108, the acoustic sensor 108 transfers acoustic mixture to the SELD system 112 through the network 110. In one embodiment of the present disclosure, the network 110 is internet. In another embodiment of the present disclosure, the network 110 is a wireless mobile network. The network 110 includes a set of channels. Each channel of the set of channels supports a finite bandwidth. The finite bandwidth of each channel of the set of channels is based on capacity of the network 110. Further, the acoustic sensor 108 comprises a plurality of microphones arranged in a predetermined pattern. The predetermined pattern is set in a manner that each of the plurality of sound events 102 gets captured. The predetermined pattern of arrangement of microphones allows the system to use the relative time difference between microphones to estimate localization information of the associated with the sound events 102. The localization information may be provided in the form of the DOA of the sound or a distance of the sound source from the acoustic sensor 108. In an example, the SELD system 112 identifies a plurality of classes to specify the plurality of sound events 102 and to differentiate between different types of sound events. In one embodiment, the SELD system 112 identifies target classes 106. The target classes 106 include the sound of a crying baby 102b, and the sound of hammer 102e. Further the SELD system 112 determines the localization information of the target classes 106 only (the sound of a crying baby 102b, and the sound of hammer 102e only out of the plurality of sound events 102).

The SELD system 112 collects a first digital representation of sound associated with the plurality of sound events 102. The first digital representation associated with the plurality of sound events 102 is collected by the acoustic sensor 108. In addition, the first set of data is in the form of a first digital representation. The first digital representation is illustrated in FIG. 1B.

Figure 1B:
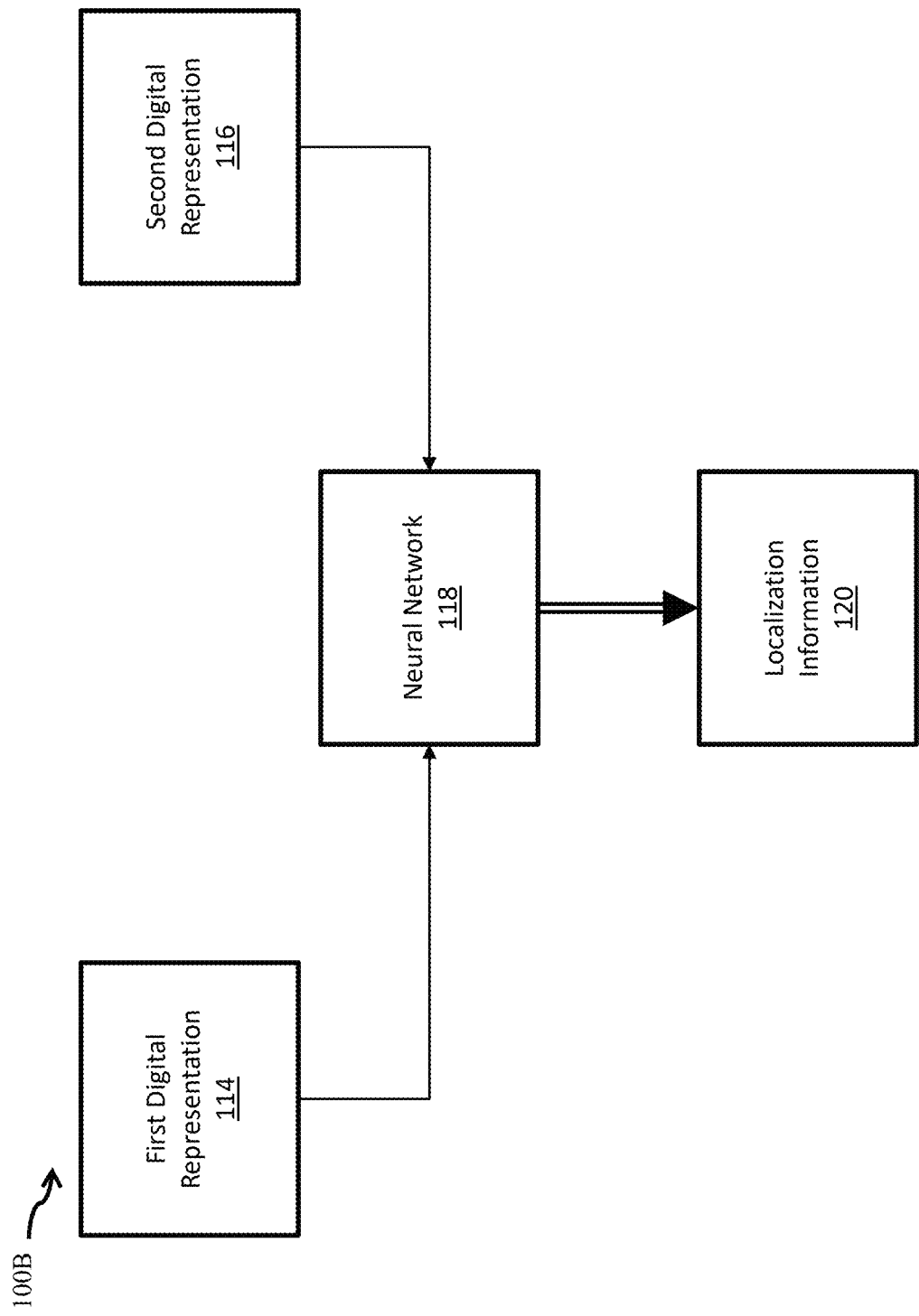
FIG. 1B shows a block diagram of a Sound Event Localization and Detection (SELD) system for detection of localization information of a target sound event, according to some embodiments of the present disclosure.
Figure 1C:
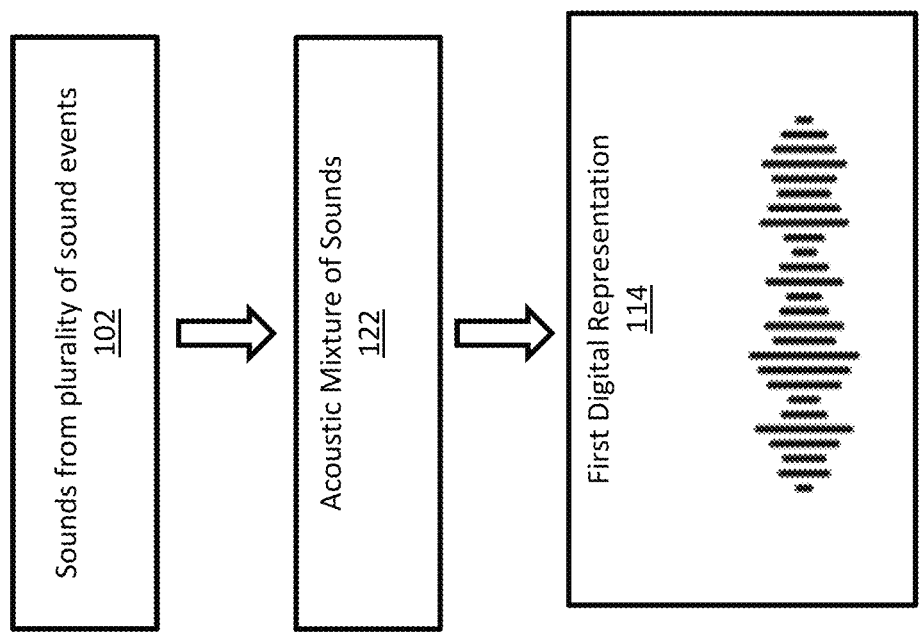
FIG. 1C shows a block diagram of a method for collecting a first digital representation, according to some embodiments of the present disclosure.

FIG. 1B shows a block diagram 100b of the SELD system 112 illustrated in FIG. 1A. The SELD system 112 is configured to collect a first digital representation 114 of an acoustic mixture of sounds sensed by the acoustic sensor 108. FIG. 1C illustrates the first digital representation 114. As shown in FIG. 1C, the first digital representation 114 is a digital representation of an acoustic mixture of sounds 122 which is obtained as a combination of sounds from plurality of sound events 102. To that end, the first digital representation 114 includes spatial and spectral features computed from the waveform representation of the acoustic mixture 122 of sounds.

In an example, the first digital representation comprises at least one of short-time Fourier transform S1 of input acoustic mixture 122 of the plurality of sound events 102, and directional sound-field intensity features S2 of acoustic mixture of the plurality of sound events 102. Referring back to FIG. 1B, the SELD system 112 further collects a second digital representation 116 of a sound corresponding to a target sound event.

Figure 1D:
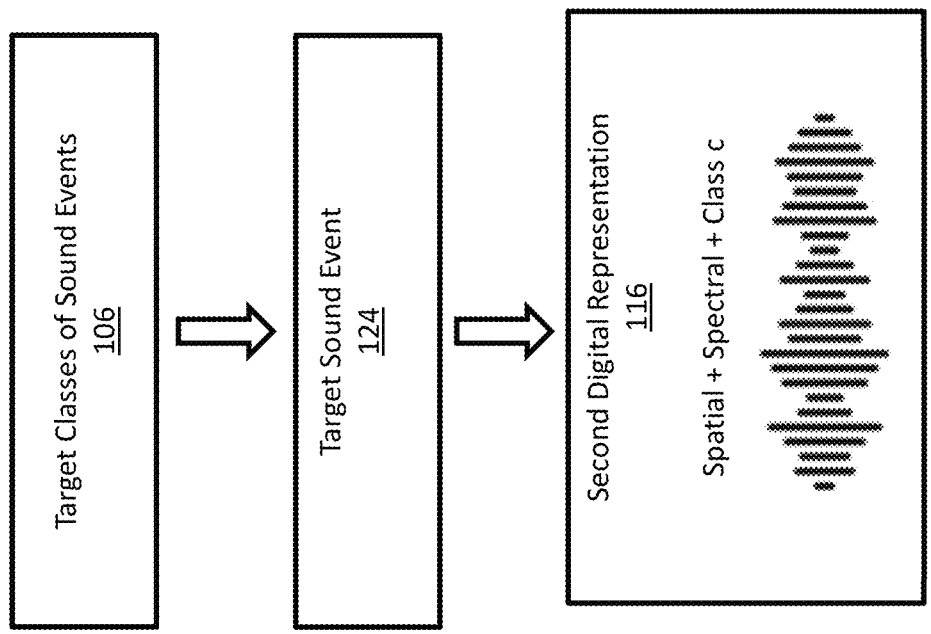
FIG. 1D shows a block diagram of a method for receiving a second digital representation, according to some embodiments of the present disclosure.

FIG. 1D illustrates the second digital representation 116. The second digital representation 116 is a digital representation of a target sound event 124 that the SELD system 112 is "interested" in localizing, from a plurality of sound event types defined by target classes 106 of sound events depicted in FIG. 1A. Therefore, the second digital representation 116 includes one or more exemplar waveforms, or a class index c, of the target sound event 124. However, this target sound event 124 may not be the exact same sound event that the SELD system 112 is trying to localize. This means that, for example, the SELD system 112 may be trying to localize the sound of the crying baby 102b, however, the second digital representation 116 is derived from the data of the target classes 106 which includes a class c for sound of a crying baby, but this crying baby is different from the crying baby 102b. Therefore, the advantage of the SELD system 112 is that this system can work even in absence of sufficient training data or related sound event data, and still efficiently localize any desired sound event.

In one example, the second digital representation 116 is a one-hot vector, $o_c=[o_1, \ldots, o_C]$ indicative of a sound event type of the target sound event among a predetermined set of sound types, where the one-hot vector $o_c$ is a C-dimensional one-hot vector, where $o_c=1$ for the class c that the SELD system 112 is interested in localizing, and $o_i=0$, $\forall i \neq c$. For example, the target classes 106 in FIG. 1A represent the predetermined set of sound types. When the sound of the crying baby 102b is taken as the target sound event 124, then a class from the target classes 106 which corresponds to a crying sound of a baby, is the sound event type that the one-hot vector $o_c$ indicates. The one-hot vector $o_c$ is a type of encoding process through which categorical data is converted to binary data, so that this categorical data can be used by a machine learning component in an efficient manner. The one-hot vector $o_c$ is transformed into an embedding vector (learned during a training phase, one for each class c), which is further processed by the machine learning component. In the system of FIG. 1B, the machine learning component is a neural network 118.

In one example, the second digital representation 116 includes a snippet of sound that represents the target sound event 124 for localizing. The snippet of sound includes a recording of an event of the same type as the target sound event 124. For example, this snippet of sound represents a "query by example" case for the neural network 118. That snippet of sound is processed to form the second digital representation 116, such as an "embedding vector", which is then processed by the neural network 118 in a similar way as the embedding vector obtained in the one-hot case.

In another example, the second digital representation 116 includes a text description or encoding of the target sound event 124. In yet another example, the second digital representation includes an imitation of a sound corresponding to the target sound event 124. Irrespective of the type of representation of the second digital representation 116, a neural network 118 is guided by the second digital representation 116 to identify and localize the target sound event.

Referring back to FIG. 1B, the SELD system 112 comprises the neural network 118 which receives the first digital representation 114 and the second digital representation 116 and processes them to produce a localization information 120 of the target sound event 124 (for example the sound of crying baby 102) forming the acoustic mixture 122 of the plurality of sound events 102. The localization information 120 of the target sound event 124 is indicative of a location of an origin of the target sound event forming the acoustic mixture with respect to a location of the acoustic sensor 108 sensing the acoustic mixture.

Figure 1E:
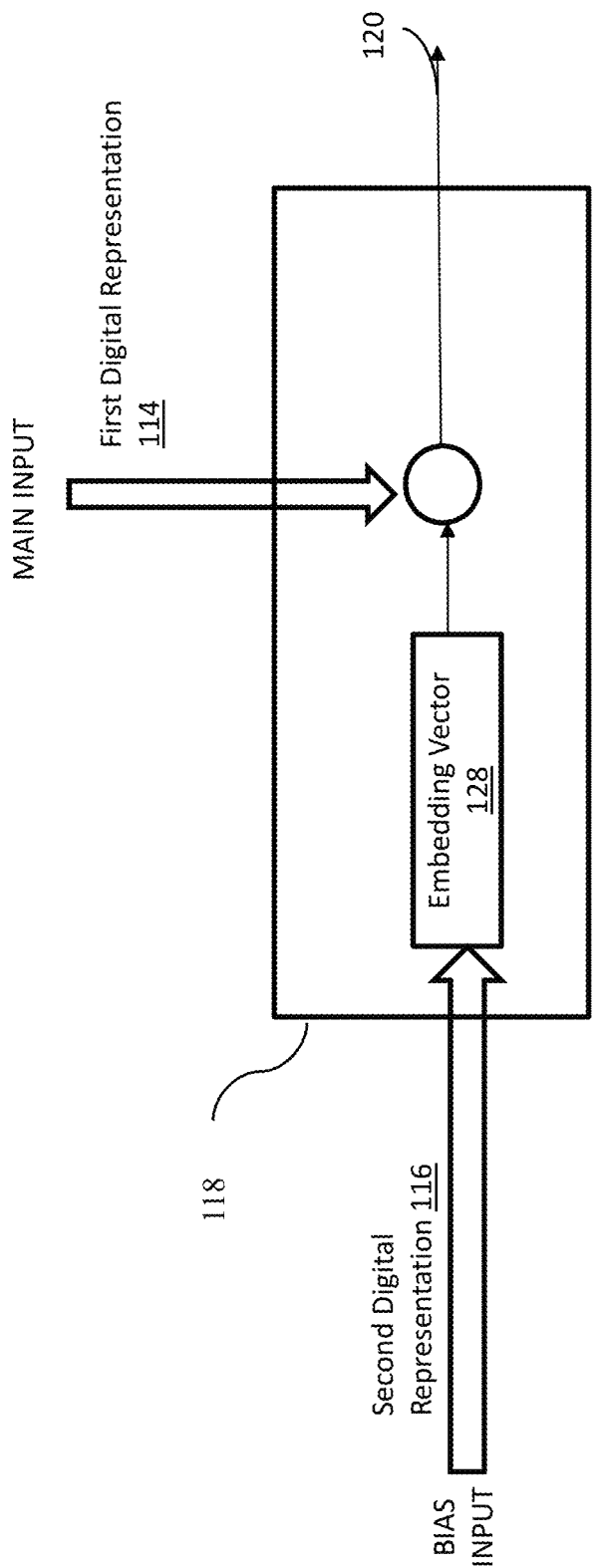
FIG. 1E shows a block diagram of a processing done by a neural network on the first digital representation and the second digital representation, according to some embodiments of the present disclosure.

The neural network 118 is trained to combine encodings of the first digital representation 114 and the second digital representation 116 to guide the processing of the first digital representation 114 based on the second digital representation 116. This is shown in FIG. 1E. To that end, the neural network 118 processes an embedding vector 128 (such as the one-hot vector $o_c$) indicated by the second digital representation 116 jointly with first digital representation 114 of the acoustic mixture 122 to produce the localization information 120 of the target sound event 124. Another exemplar working of the neural network 118 is shown is shown in FIG. 1F.

Figure 1F:
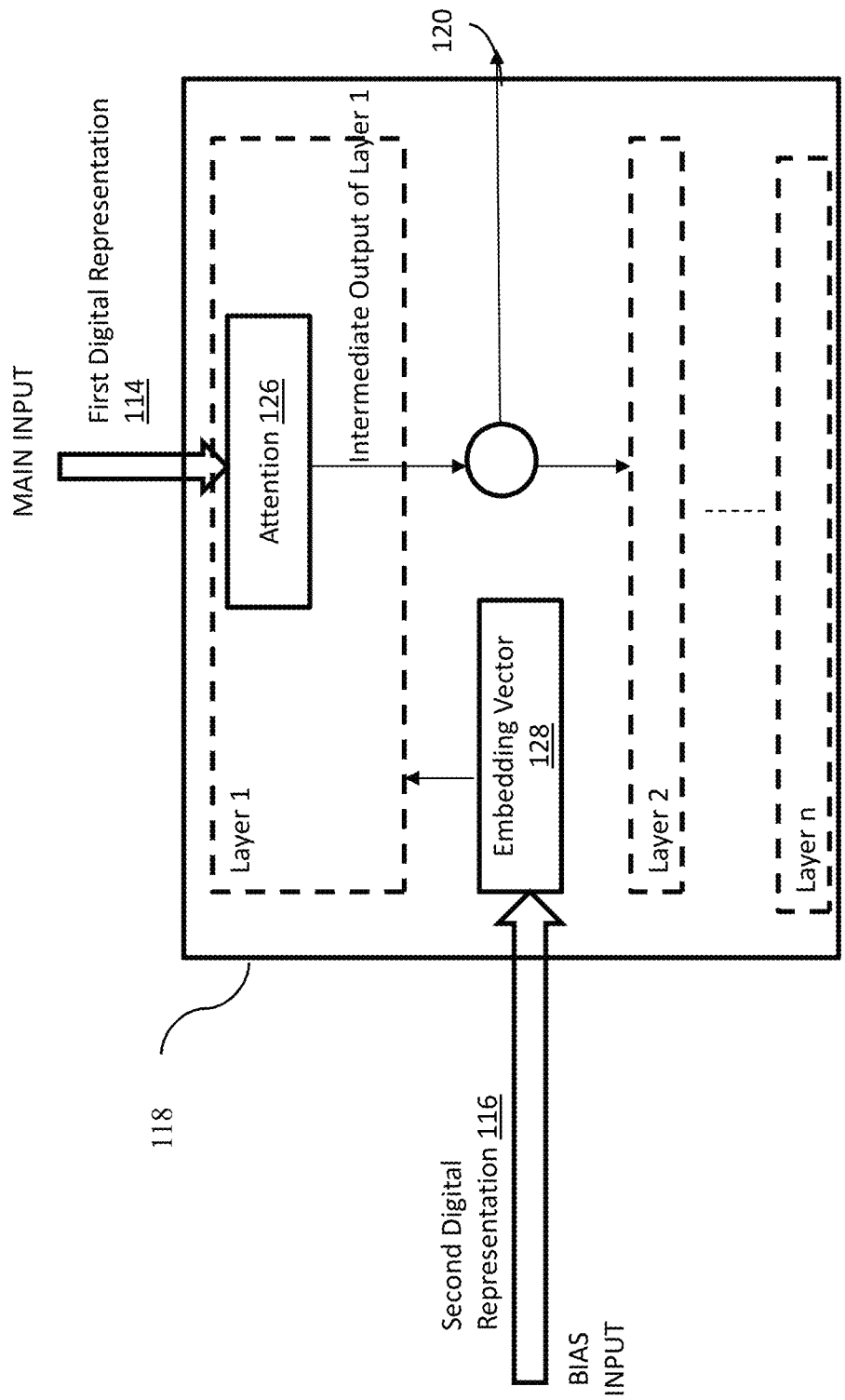
FIG. 1F shows a block diagram of another processing done by a neural network on the first digital representation and the second digital representation, according to some embodiments of the present disclosure.

As shown in FIG. 1F, the neural network 118 is configured to process the first digital representation 114 and the second digital representation 116 differently. The first digital representation 114 is processed as the main input, and the second digital representation 116 is used to "bias" the way the first digital representation 114 is processed. The neural network 118 processes the first digital representation 114 with an attention mechanism 126 placing the first digital representation 114 in a context of embeddings of the second digital representation 116 which are represented by the embedding vector 128. In an example, the attention mechanism 126 may be a multi-head attention mechanism, and correspondingly, the neural network 118 may be a multi-head neural network 118. To that end, the multi-head neural network 118 is trained with a permutation invariant training to output different location information of different target sound events into different heads of the multi-head neural network 118. This will be further explained in conjunction with FIG. 2.

The neural network 118 is configured to identify the target sound event 124 interfered with other sounds in the acoustic mixture 122 by combining encodings of the second digital representation 116 of the target sound event 124 with at least some intermediate outputs of at least some layers of the neural network 118. To that end, the neural network 118 includes multiple layers of processing, such as a layer 1, a layer 2, . . . , and a layer n.

In one example, the second digital representation 116 is input to one or multiple feature-invariant linear modulation (FiLM) blocks and one or multiple FiLM blocks are combined with the outputs of the intermediate layers of the neural network 118. This combination is then submitted to the next layers of the neural network 118. The use of FiLM blocks in the neural network 118 will be further explained in FIG. 4.

Thus, using the different components described above, the SELD system 112 is configured to provide localization information 120 associated with the target sound event 124.

Figure 2:
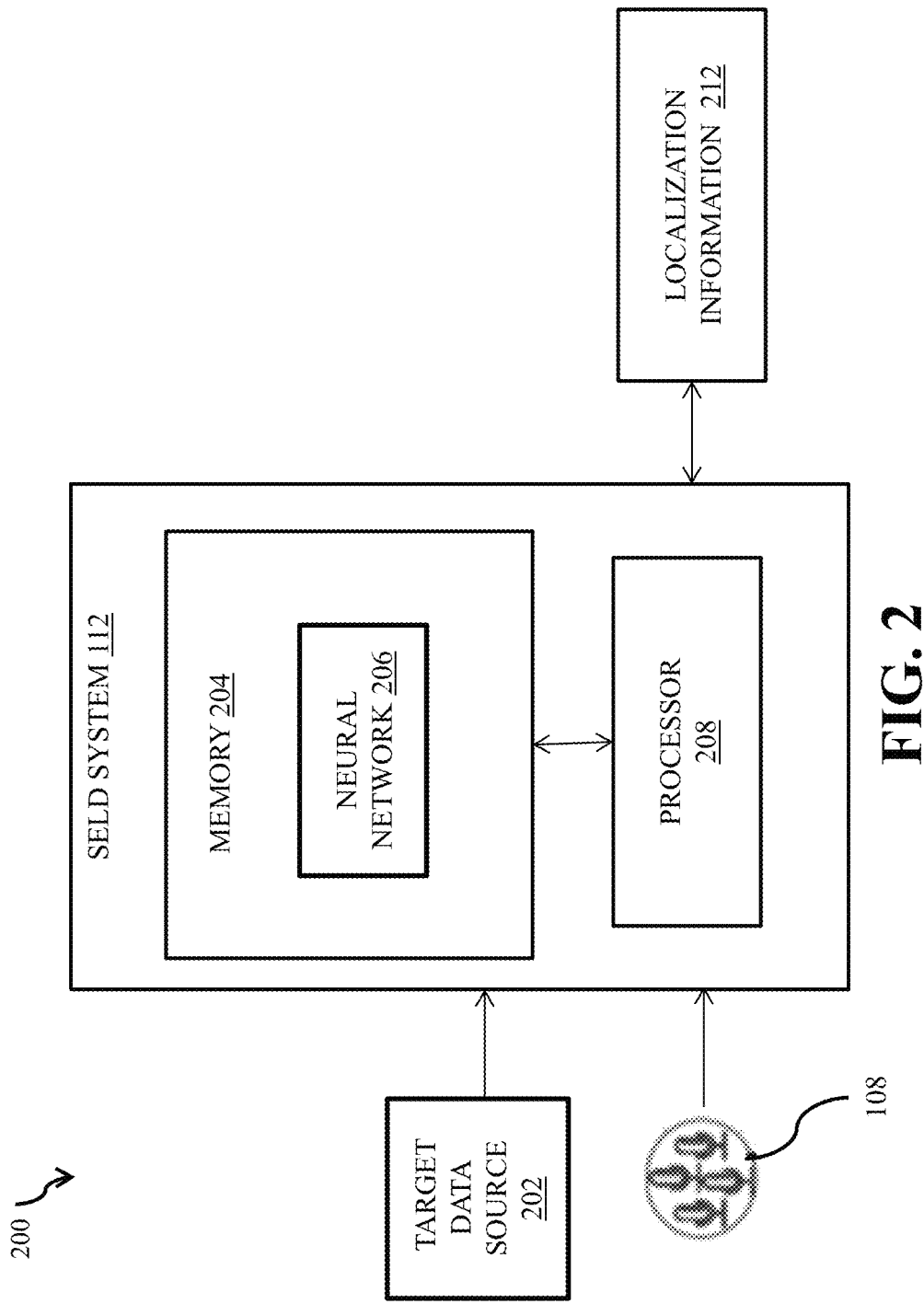
FIG. 2 shows a schematic block diagram of a Sound Event Localization and Detection (SELD) system for estimation of the localization information of the one or more target sound events, according to some embodiments of the present disclosure.

The SELD system 112 is further explained with reference to FIG. 2. FIG. 2 shows a schematic block diagram 200 of the SELD system 112 for estimation of localization information of one or more target sound events, according to embodiments of the present disclosure. The block diagram 200 comprises the acoustic sensor 108, a target data source 202, and the SELD system 112.

The SELD system 112 includes a memory 204, a neural network 206 and a processor 208. The memory 204 comprises at least one of RAM, ROM, EEPROM, flash memory or other memory technology, CD-ROM, digital versatile disks (DVD) or other optical disk storage, magnetic cassettes, magnetic tape, magnetic disk storage, or any other storage medium which can be used to store the desired information, and which can be accessed by the SELD system 112. The memory 204 includes non-transitory computer-storage media in the form of volatile and/or nonvolatile memory. The memory 204 may be removable, non-removable, or a combination thereof. Exemplary memory devices include solid-state memory, hard drives, optical-disc drives, and the like. The memory 204 stores instructions which are executed by the processor 208. The execution of the instructions by the processor 208 causes the SELD system 112 to perform a set of actions explained below.

The SELD system 112 receives a set of data from the target data source 202. The target data source 202 corresponds to a source that is producing sound and is required to be localized out of multiple sound sources. The second set of data is associated with the target sound event 124. In an example, there are three sound sources in a house. The three sound sources are television, mobile phone, and a person who is singing. The person who is singing is required to be localized and hence singing is identified as the target sound event 124. The set of data is utilized for identifying the one or more target sound events out of the plurality of sound events 102. The set of data is used to derive the second digital representation 116 from acoustic properties of the target data source 202.

The SELD system 112 determines the localization information 212 of the one or more target sound events identified in the second digital representation 116. The localization information 212 is determined by processing the first digital representation 114 and the second digital representation 116 with the neural network 206. The neural network 206 is equivalent to the neural network 118 discussed above. The neural network 206 is trained for considering sound events of the plurality of sound events 102 other than the identified target sound event as the directional interferences 104. The directional interferences 104 are robustly ignored by combining the second digital representation 116 of the desired target sound event with at least one intermediate output received after processing the first digital representation 114 with the neural network 206. Generally, when the directional interferences 104 are robustly ignored, the SELD system 112 becomes more efficient in determining the localization information 212 and there are less chances of errors. In one example, the neural network 206 is a deep neural network (DNN). In general, a DNN is an artificial neural network (ANN) with multiple layers between input and output layers.

In one embodiment, the neural network 206 is a multi-head neural network trained with a permutation invariant training to output different localization information of different target sound events into different heads of the multi-head neural network. The multi-head neural network is needed when multiple instances of the target sound event type are producing sound simultaneously from different locations. A multi-head neural network comprises multiple output heads, where each output head corresponds to a different instance of the target sound event. For example, if two babies are crying simultaneously, each output head will contain the location information for a single baby. Therefore, for different target sound events, output localization information is produced from different output heads of the multi-head neural network. Further, the permutation invariant training is based on the premise that the training data comprises an unordered set of training data components. The neural network 206 is able to identify the desired target class for by attending to an encoding or embedding vector of each target class, which is specified by the second digital representation 116 of a target class of the target sound event 124. The output of the permutation invariant trained multi-head neural network 118 includes multiple output heads for outputting localization information from the SELD system 112.

Figure 3:
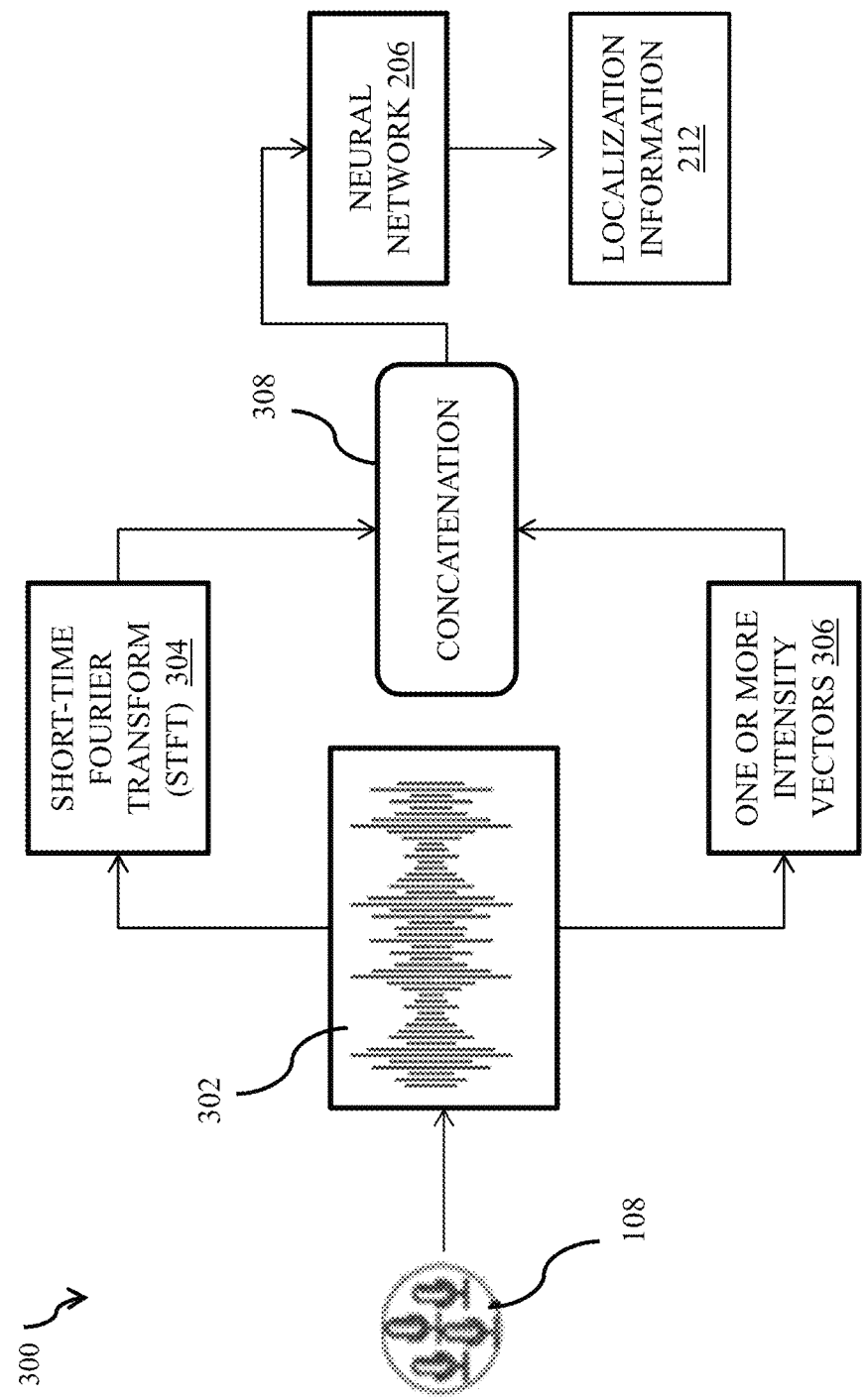
FIG. 3 shows a block diagram showing an exemplar representation of working of the SELD system of FIG. 2, according to some embodiments of the present disclosure.

Furthermore, the SELD system 112 outputs the localization information 212 of the identified target sound as explained further in an example implementation showing FIG. 3.

FIG. 3 illustrates an exemplary representation 300 of working of the SELD system 112, according to embodiments of the present disclosure. The acoustic sensor 108 sends a first digital representation 302 of an acoustic mixture of plurality of sound events 102 to the SELD system 112. The first digital representation 302 undergoes Short-time Fourier Transform (STFT) 304. The STFT 304, is a Fourier-related transform that is used to determine sinusoidal frequency and phase content of local sections of the first digital representation 302 as it changes over time. Further, one or more intensity vectors 306 are computed to measure spatial properties of the plurality of sound signals represented by the first digital representation 302. In general, intensity vector determines the position of one point/object/sound source relative to another. To that end, the SELD system 112 utilizes the one or more intensity vectors 306 to represent the spatial information in the sound signal and when combined with the STFT 304 to classify the plurality of sound signals into different classes of the plurality of sound events 102. Further, the SELD system 112 performs training of the neural network 206 based on the plurality of sound signals included in the acoustic mixture of sounds represented by the first digital representation, and the output received after the STFT 304. During training, the SELD system 112 performs concatenation 308 of the output received after the STFT 304 and after assigning the one or more intensity vectors 306. The concatenated data obtained by concatenation 308 operation is sent to the neural network 206. The neural network 206 is trained to estimate the target sound event out of the plurality of sound events 102 along with a target acoustic source and a target class of the target sound event from the plurality of classes with utilization of the second digital representation, as discussed previously. Also, the SELD system 112 acts as a class conditioned SELD network to determine the localization information 212 of the identified target sound event. The class conditioned SELD network is further explained in FIG. 4.

Figure 4A:
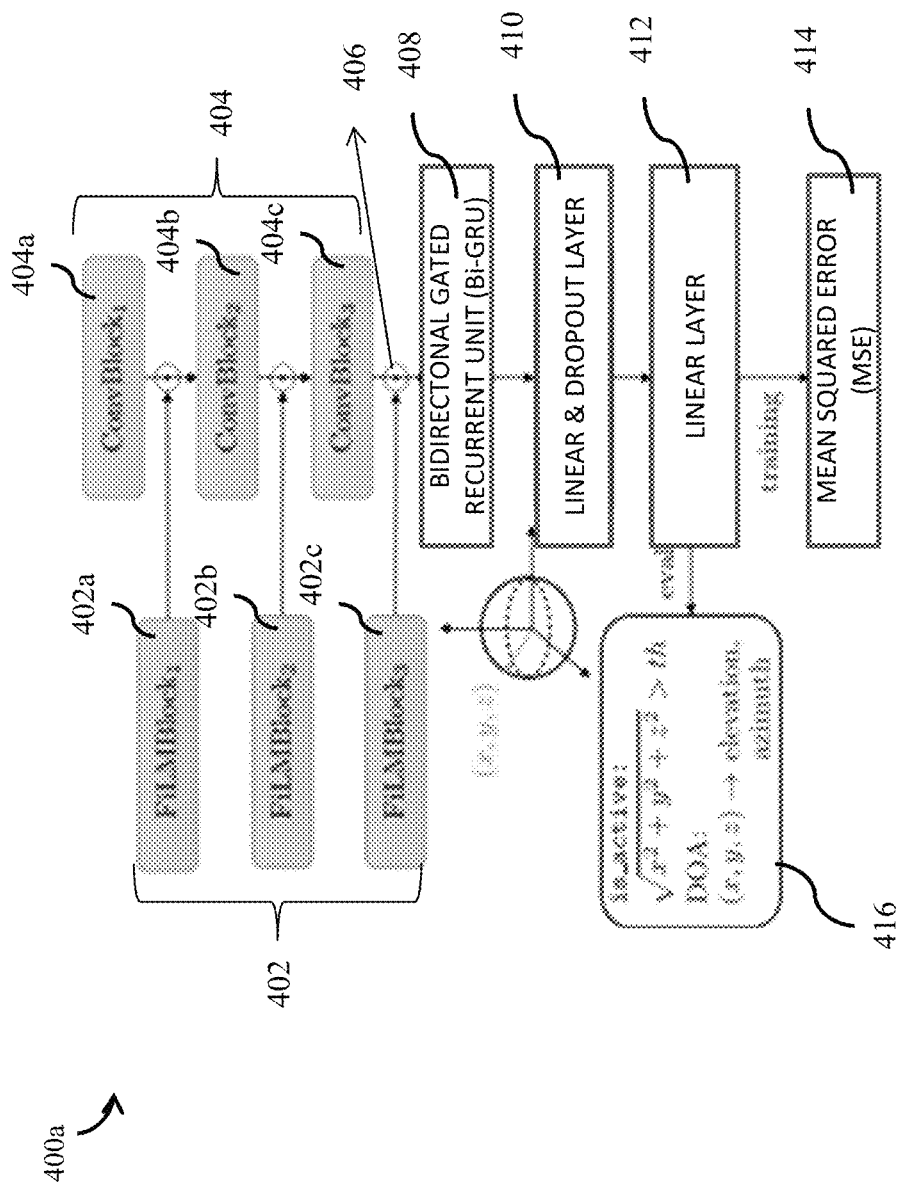
FIG. 4A shows a block diagram showing the architecture of the class conditioned SELD network, according to some embodiments of the present disclosure.

FIG. 4A shows architecture of a class conditioned SELD network 400a, according to some embodiments of the present disclosure. The class conditioned SELD network 400a comprises at least one FiLM block 402 that is directed to one or more convolution blocks 404. The at least one FiLM block 402 and the one or more convolution blocks 404 are trained to identify the target sound event and estimate the localization information 212 of the identified target sound event. In an example, the class conditioned SELD network 400a comprises $FiLM\ Block_1$ 402a, $FiLM\ Block_2$ 402b, and $FiLM\ Block_3$ 402c. In addition, the class conditioned SELD network 400a comprises $ConvBlock_1$ 404a, $ConvBlock_2$ 404b, and $ConvBlock_3$ 404c.

The FiLM blocks 402a, 402b, and 402c output a set of parameters $(\gamma, \beta)=f(e)$ that are used for scaling and shifting learned feature maps M of a baseline SELD network: $FiLM(Mi|\gamma i, \beta i)=\gamma i Mi+\beta i$, where i refers to a channel index, and $\gamma$ and $\beta$ correspond to trainable parameters that result in the linear/affine transformation, which is different for all channels. In general, a FiLM layer applies a feature-wise affine transformation to its input. In addition, a FiLM operation 406 is applied to the feature maps of each convolutional block 404a, 404b, and 404c in the baseline SELD network. The FiLM operation 406 refers to as: $(1+\gamma)*x+\beta$, where x is the input.

The $FiLM\ Block_1$ 402a is directed to $ConvBlock_1$ 404a and then the FiLM operation 406 is applied to the feature map of $ConvBlock_1$ 404a. In addition, the $FiLM\ Block_2$ 402b is directed to $ConvBlock_2$ 404b and then the FiLM operation 406 is applied to the feature map of $ConvBlock_2$ 404b. The $FiLM\ Block_3$ 402c is directed to $ConvBlock_3$ 404c and then the FiLM operation 406 is applied to the feature map of $ConvBlock_3$ 404c. Further, the feature maps of each of the ConvBlock 404a, 404b, and 404c are sent as output to a bidirectional gated recurrent unit (BiGRU) 408. In general, BiGRU is a sequence processing model that consists of two GRUs, one taking the input in a forward direction, and the other in a backward direction. The BiGRU 408 is a bidirectional recurrent neural network with only the input and forget gates. In addition, outputs of both, the forward neural network, and the backward neural network, are connected in a same or single output layer. Further, the output generated by the BiGRU 408 is sent to a linear and dropout layer 410. In general, linear layer is capable of learning an average rate of correlation between the output and the input, for instance if x and y are positively correlated=>w will be positive, if x and y are negatively correlated=>w will be negative. If x and y are totally independent=>w will be around 0. In general, dropout is a technique used to prevent a model from overfitting. The output generated by the linear and dropout layer 410 is further sent to a linear layer 412. The linear layer 412 has a tanh activation function. The tanh activation function maps values between −1 and 1. The linear layer 412 produces three outputs: the estimated x, y, and z coordinates of the one or more target sound events. During the training phase, the localization information, including DOA (azimuth and elevation angle) of the one or more target sound events is present. The DOA is converted into Cartesian (x, y, z) coordinates using the typical formula for converting between spherical and Cartesian coordinates, where the radius of the DOA is set to one during times when a target source is active and set to zero during times when the target source is inactive. Then the x, y, z output from the linear layer 412 is compared with a ground truth x, y, z data to compute the mean squared error (MSE) 414 during the training phase. In addition, the linear layer 412 output x, y, z coordinates are converted into an estimated direction of arrival 416 of the identified target sound event by converting the x, y, and z location coordinates of the identified target sound event into azimuth and elevation angles.

The SELD system 112 defines the C-dimensional one-hot vector $o_c=[o_1, \ldots o_c]$, where $o_c=1$ for a target class c of the plurality of classes, and $o_i=0$, $\forall i \neq c$. The SELD system 112 learns model parameters θ in order to estimate the direction of arrival 416 $\hat{D}_c = F_{74}(X, o_c)$, where $\hat{D}_c \in R^{T \times 3}$ represents estimation of the direction of arrival 416 for the target class c only and $X \in R^{M \times F \times T}$ where T is the number of time steps, M represents the number of microphones, and F the dimension of the input feature. The SELD system 112 learns model parameters by minimizing the MSE between actual direction of arrival (D) and the estimated direction of arrival ($\hat{D}_c$). The direction of arrival 416 is estimated using an Activity-Coupled Cartesian Direction of Arrival (ACCDOA) format. In an example, the ACCDOA format uses a norm of a direction of arrival (DOA) vector $\|d_{t,c}\|_2$ to decide if the target class c is active at frame t or not. The default threshold τ on the norm is set to 0.5.

Figure 4B:
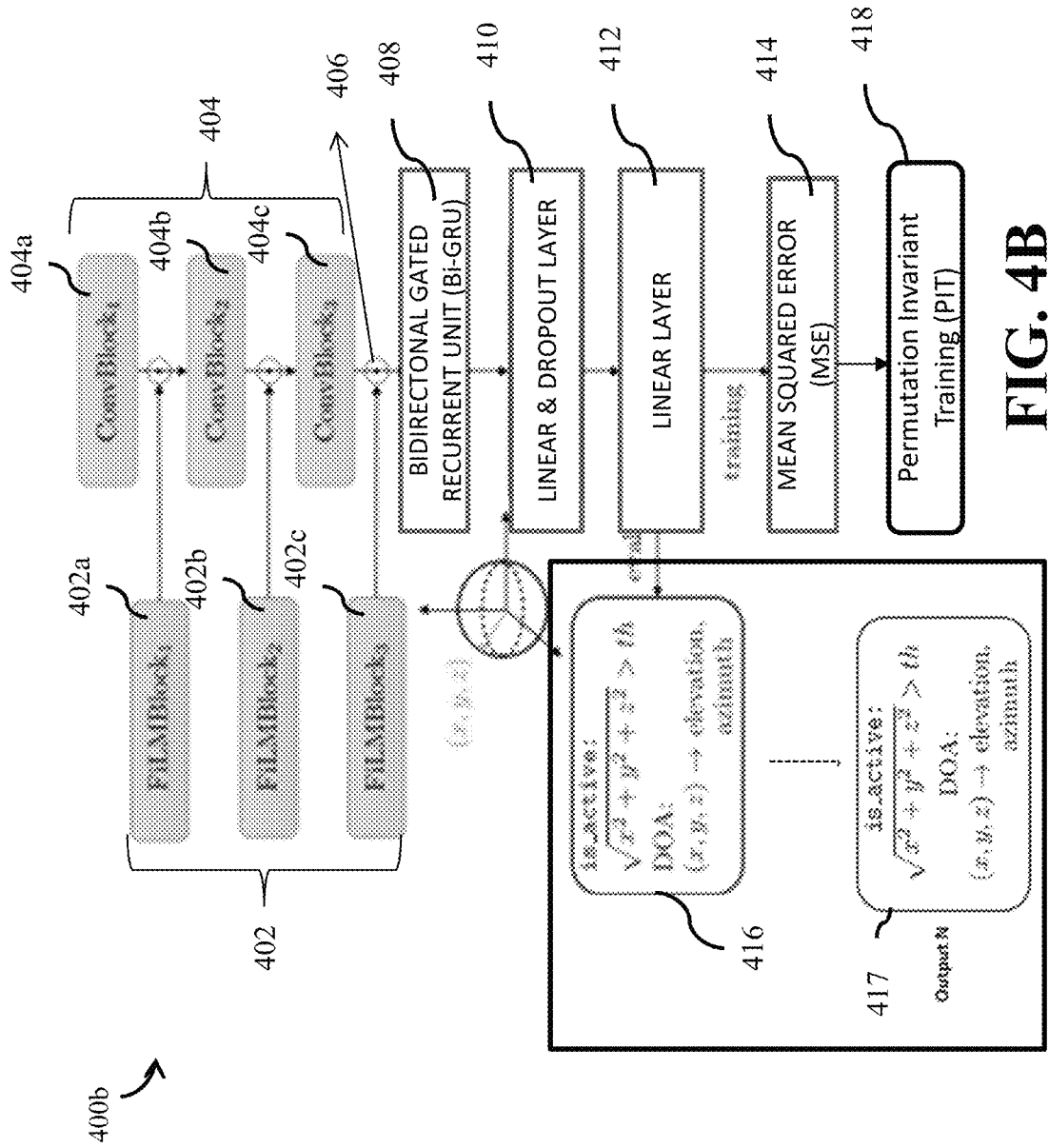
FIG. 4B shows another block diagram showing architecture of the class conditioned SELD network for locating multiple events, according to some embodiments of the present disclosure.

In an example, to detect multiple target events, an architecture shown in FIG. 4B is used.

FIG. 4B shows architecture of a class conditioned SELD network 400*b*, according to some embodiments of the present disclosure. The class conditioned SELD network 400*b* is similar to class conditioned SELD network 400*a* except addition of blocks 417 and 418 to enable multiple target event detection.

To that end, the single output class conditioned SELD network 400*a* is transformed to output multiple estimated source locations as shown in FIG. 4B. The network 400*b* of FIG. 4B shows the maximum number (N) of possible simultaneous output events and the SELD network 400*b* outputs a separate location representation for each of the N sources 417. During training, because all network outputs correspond to target events, the order in which the network chooses to output target events may not match the order of the events in the ground truth signal, so a permutation invariant training (PIT) 418 is required. PIT computes the mean squared error (MSE) for all possible orderings between the ground truth and output locations. For example, when N=2, there are two possible orderings: 1. (ground_truth_1→output_1, ground_truth_2→output_2) and 2. (ground_truth_1→output_2, ground_truth_2→output_1). PIT 418 then uses the ordering with lowest MSE as the error signal for back propagation during neural network training.

The neural network architectures 400*a* and 400*b* represent a class conditioned SELD network which comprises at least one FiLM block 402 that is directed to one or more convolution blocks 404. The at least one FiLM block 402 and the one or more convolution blocks 404 are trained to identify the target sound event and estimate the localization information the target sound event.

Figure 5A:
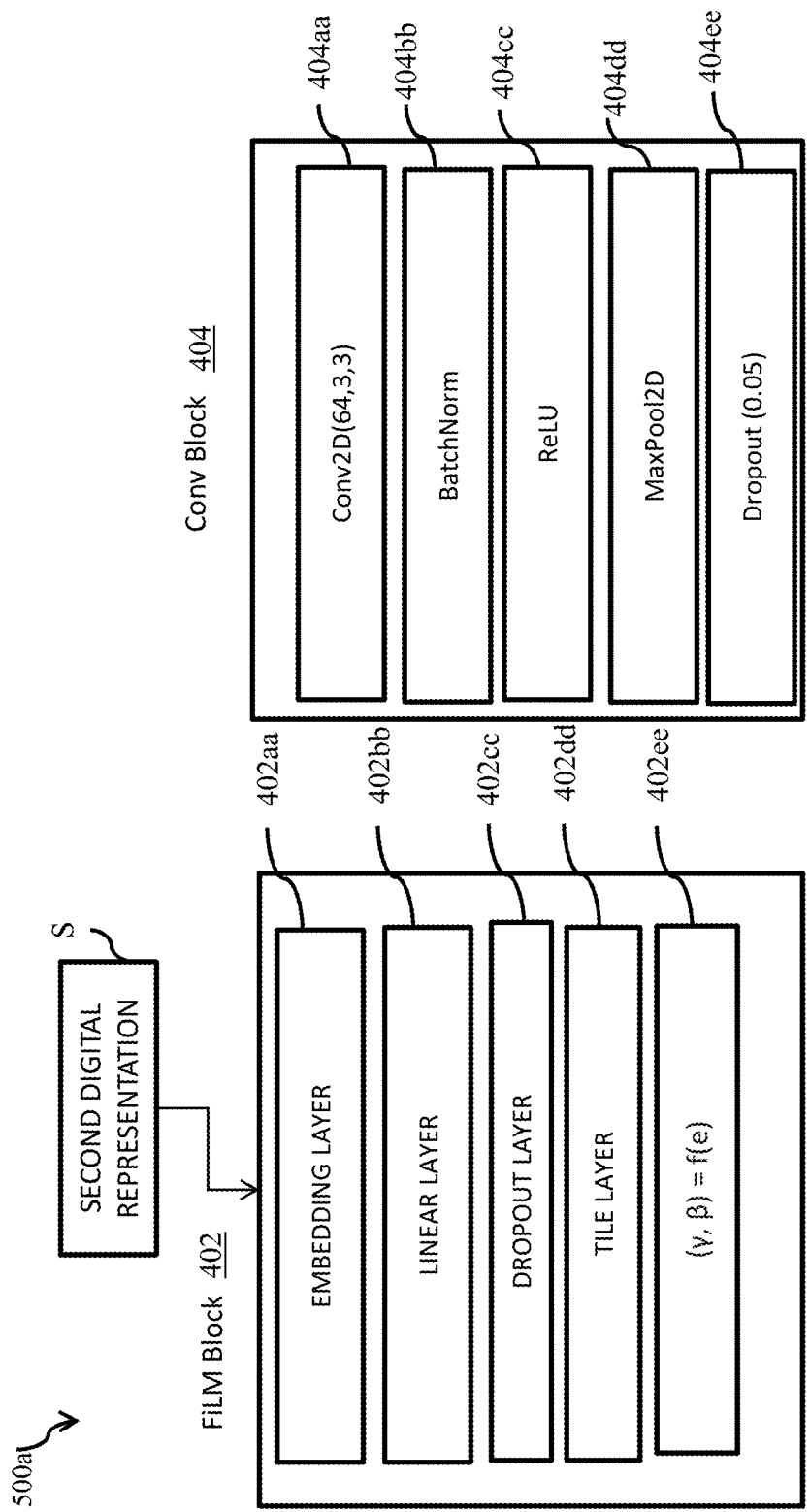
FIG. 5A shows a block diagram of a feature-invariant linear modulation (FiLM) block and a convolution block, according to some embodiments of the present disclosure.
Figure 5B:
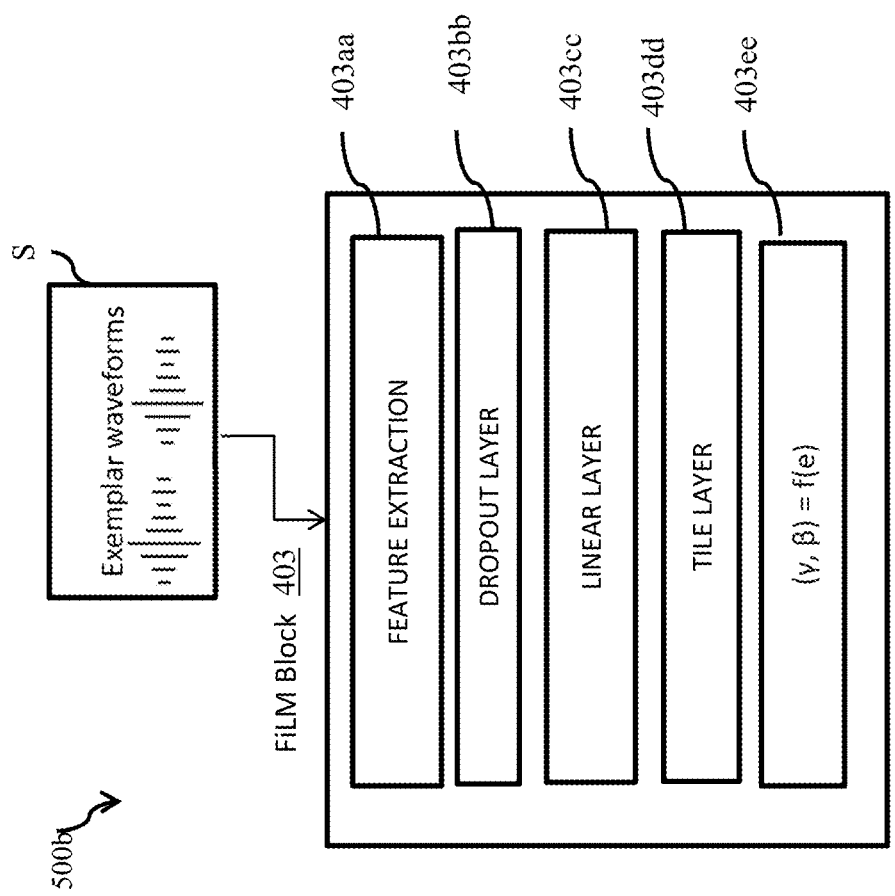
FIG. 5B shows a block diagram of a FiLM block for processing an exemplar waveform, according to some embodiments of the present disclosure.

The FiLM block 402 is further explained elaborately in FIG. 5A and FIG. 5B.

FIG. 5A illustrates a block diagram 500*a* of the FiLM block 402 and the convolution block 404, according to embodiments of the present disclosure. The second digital representation S is used as input to at least one FiLM block 402. The FiLM block 402 comprises an embedding layer 402*aa*, a linear layer 402*bb*, a dropout layer 402*cc*, a tile layer 402*dd* and an output layer 402*ee*. The one-hot vector $o_c$ is passed through the learned embedding layer 402*aa*, to obtain embedding $e \in R^N$ that encodes the target class information. Further, the target class information is passed through the linear layer 402*bb* and the dropout layer 402*cc*. The linear layer 402*bb* is utilized to learn a mapping of the embedding dimension N into the dimension of the feature map to which the FiLM conditioning is applied. In addition, the dropout layer 402*cc* randomly sets input units to 0 with a frequency of rate at each step during the training phase, which prevents overfitting. The input units that are not set to 0, are further scaled up by 1/(1−rate) such that the sum of overall input units remain unchanged. In general, the dropout layer 402*cc* only applies when training is set to "True" such that no values are dropped during inference.

Further, the FiLM block 402 utilizes the tile layer 402*dd*. Because the conditioning input representing the general acoustic properties of the target class it is the same at all time instants, the tiling layer 402*dd* represents the copying of the conditioning information across time steps. Then, the trained models are used to infer results about the DOA of the one or more target sound events 124. Furthermore, the FiLM block 402 outputs a set of parameters 402*ee* (γ, f(e)) that are used for scaling and shifting the learned feature maps M of the baseline network: FiLM(Mi|γi, βi)=γiMi+βi, where i refers to a channel index.

The FiLM block 402 is directed to the one or more convolution blocks 404. In addition, each of the one or more convolution blocks 404 comprises 2-dimensional convolution layer 404*aa*, batch normalization feature 404*bb*, rectified linear activation function (ReLU) 404*cc*, max pooling layer 404*dd*, and dropout layer 404*dd*. The 2-dimensional convolution layer 404*aa* input includes 64-dimensional Mel-spectrograms and 3-channel first-order Ambisonic (FOA) intensity vector. In general, the first order Ambisonic format in 2D consists of one signal corresponding to an omnidirectional pickup pattern (called W), and two signals corresponding to the figure-of-eight pickup patterns aligned with Cartesian axes (X and Y). In an embodiment, a filter, or a kernel in the 2-dimensional convolution layer slides over the input data, performing an element-wise calculation. As a result, it sums up the results into a single output. The kernel performs the same operation for every location it slides over, transforming a 2D matrix of features into a different 2D matrix of features. Further, the convolution block 404 utilizes the batch normalization feature 404*bb* technique for training the deep neural network 206 that standardizes the inputs to a layer for each mini batch.

The convolution block 404 comprises the ReLU 404*cc*. The ReLU 404*cc* is a piecewise linear function that outputs the input directly if it is positive, otherwise, it outputs zero. In general, ReLU does not activate all the neurons at the same time.

Further, the convolution block 404 utilizes the max pooling layer 404*dd*. The max pooling layer 404*dd* is a 2-dimensional layer. The max pooling layer 404*dd* downsamples the input along with its spatial dimensions by taking maximum value over an input window (of size defined by pool size) for each channel of the input. Further, the convolution block 404 includes the dropout layer 404*ee* for preventing overfitting.

The neural network 118 uses a combination of the FiLM Block 402 and the Conv block to process the first digital representation 114 and the second digital representation 116. To that end, the second digital representation 116 is submitted to one or multiple FiLM blocks 402. The outputs of the FiLM blocks 402 are combined with the outputs of the intermediate layers of the neural network 118, and the combinations are submitted to the next layers of the neural network 118. This was shown in FIG. 4A and FIG. 4B.

FIG. 5B describes a FiLM Block 403, which is a slight variation over the FiLM block 402 in the case where the second digital representation S includes one or more exemplar waveform representations indicative of one or a combination of spatial characteristics, spectral characteristics, or class information of the target sound event 124. In this case, the target sound event 124 may not have been seen during training, but an example(s) of the type of sound to localize is available at inference time. In this case, the one or more exemplar waveforms S are first processed by a Feature extraction block 403*aa* to convert the waveforms into an embedding vector. Example feature extraction processes could be the average frequency spectrum of all exemplar waveforms or a separate network that inputs the exemplar waveforms and outputs a single embedding vector. The remaining components of the FiLM Block (403*bb*, 403*cc*, 403*dd*, 403*ee*) are unchanged from the case where second digital representation is in a different form, such as in the form of a one-hot vector.

In this manner, the SELD 112 system uses the different combinations of the FiLM block 402 or 403, and the Cony block 404 for localization of target sound events 124, even with less training data. The SELD system 112 may then be used in many audio processing applications.

Figure 6:
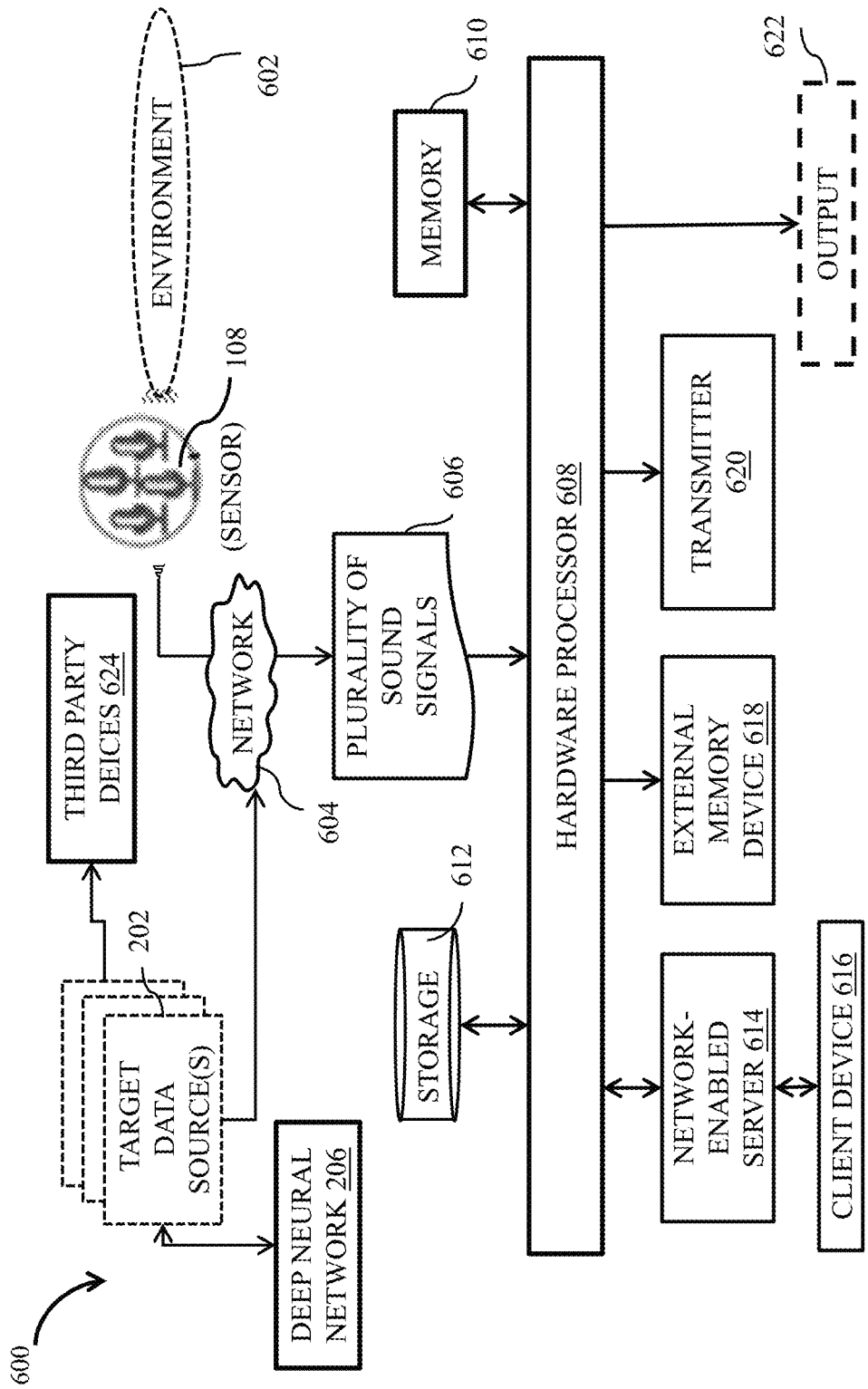
FIG. 6 shows a block diagram of the SELD system for performing audio signal processing, according to some embodiments of the present disclosure.

FIG. 6 is a block diagram 600 of the SELD system 112 for performing audio signal processing, according to embodiments of the present disclosure. In some example embodiments, the block diagram 600 includes the acoustic sensor 108 or sensors that collect data including the plurality of sound signals 606 of the plurality of sound events 102 from an environment 602. In addition, the acoustic sensor 108 collects data associated with the one or more target sound events from the target data source(s) 210.

The SELD system 112 includes a hardware processor 608. The hardware processor 608 is in communication with a computer storage memory, such as a memory 610. The memory 610 includes stored data, including algorithms, instructions and other data that is implemented by the hardware processor 608. It is contemplated that the hardware processor 608 includes two or more hardware processors depending upon the requirements of the specific application. The two or more hardware processors is either internal or external. SELD system 112 is incorporated with other components including output interfaces and transceivers, among other devices.

In some alternative embodiments, the hardware processor 608 is connected to the network 604, which is in communication with the target data sources 210. The network 604 includes but is not limited to, by non-limiting example, one or more local area networks (LANs) and/or wide area networks (WANs). The network 604 also includes enterprise-wide computer networks, intranets, and the Internet. The SELD system 112 includes one or more number of client devices, storage components, and data sources. Each of the one or more number of client devices, storage components, and data sources comprise a single device or multiple devices cooperating in a distributed environment of the network 604.

In some other alternative embodiments, the hardware processor 608 is connected to a network-enabled server 614 connected to a client device 616. The network-enabled server 614 corresponds to a dedicated computer connected to a network that run software intended to process client requests received from the client device 616 and provide appropriate responses on the client device 616. The hardware processor 608 is connected to an external memory device 618 that stores all necessary data used in the DOA estimation, and a transmitter 620. The transmitter 620 helps in transmission of data between the network-enabled server 614 and the client device 616. Further, an output 622 for one or more target sound events is generated.

The target data source(s) 202 comprise data resources for training deep neural network 206. For example, in an embodiment, the training data includes acoustic signals of multiple speakers, talking simultaneously. The training data also includes acoustic signals of single speaker talking alone, acoustic signals of single or multiple speakers talking in a noisy environment, and acoustic signals of noisy environments.

The SELD system 112 also includes third party devices 624, which comprise of any type of computing device, such as automatic speech recognition (ASR) system. For example, the third-party devices include but not limited to a computer device, or a mobile device. The mobile device includes but is not limited to a personal data assistant (PDA), a smartphone, smart watch, smart glasses (or other wearable smart device), augmented reality headset, virtual reality headset, a laptop, a tablet, a remote control, an entertainment system, a vehicle computer system, an embedded system controller, an appliance, a home computer system, a security system, a consumer electronic device, or other similar electronics device. In addition, the mobile device includes but is not limited to a microphone or line-in for receiving audio information, or a communication component (e.g., Wi-Fi functionality) for receiving such information from another source, such as the Internet. In one example embodiment, the mobile device is capable of receiving input data such as sound signals. For instance, the input data includes sound event of a speaker into a microphone of the mobile device while multiple speakers in a room are talking. The input data is processed by the ASR in the mobile device using the SELD system 112 to determine a class of the sound event. The SELD system 112 enhances the input data by reducing noise in environment of the speaker, separating the speaker from other speakers, or enhancing audio signals to enable the ASR to output the DOA of the sound event.

Additionally, the SELD system 112 stores the input data in the storage 612. The storage 612 stores information including data, computer instructions (e.g., software program instructions, routines, or services), and/or data related to the deep neural network 206. For example, the storage 612 stores data from the target data source(s) 210, one or more deep neural network models, information for generating and training deep neural network models, and the computer-usable information outputted by one or more deep neural network models.

In addition to estimating a DOA, it is also possible to include the distance to the target sound event in the localization data output by the network. If training data to estimate distance is available it can be used as an additional output of the neural network. Alternatively, we can estimate DOAs from multiple sub-arrays and use triangulation to estimate distance from multiple DOAs at known sub-array locations.

Figure 7:
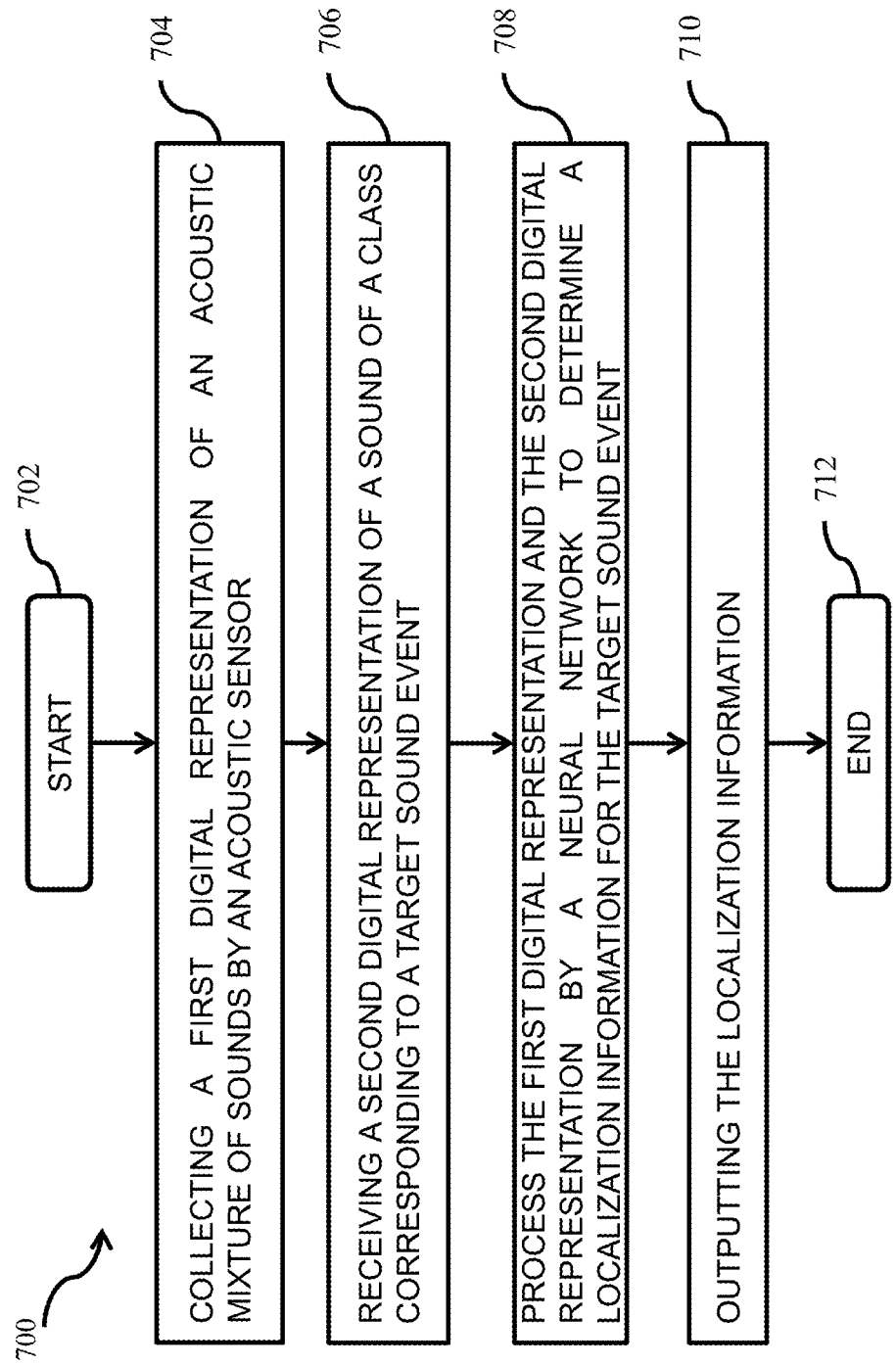
FIG. 7 shows a flow chart depicting a method for estimation of the localization information of the one or more target sound events, according to some embodiments of the present disclosure.

FIG. 7 illustrates a flow chart depicting a method 700 for localization of the one or more target sound events, according to various embodiments of the present disclosure. The method is performed by the SELD system 112. The flow chart initiates at step 702. Following step 702, at step 704, the method includes collecting, at the SELD system 112, a first digital representation of an acoustic mixture of sounds sensed by an acoustic sensor, such as the acoustic mixture 122 of sounds from the plurality of sources 102 detected by the acoustic sensor 108. The acoustic sensor 108 comprises a plurality of microphones arranged in a predetermined pattern. The first digital representation is the first digital representation 114 shown in FIG. 1C which corresponds to representation of spatial and spectral features of acoustic mixture of the plurality of sound events 102. In one example, the first digital representation 114 comprises at least one of short-time Fourier transform of input acoustic mixture 122 of the plurality of sound events 102, and directional sound-field intensity features of acoustic mixture 122 of the plurality of sound events 102.

At step 706, the method 700 includes receiving a second digital representation associated with the one or more target sound events from a target data source. For example, FIG. 1D represents the second digital representation 116, representing special, spectral and class information associated with the target sound event out of the plurality of sound events 102. The method 700 further includes creating the plurality of classes to classify the plurality of sound events 102. The method 700 includes identifying the one or more target sound events out of the plurality of sound events 102 along with the target acoustic source and the target class of the one or more target sound events from the plurality of classes with utilization of the second digital representation. In one embodiment, the second digital representation 116 is includes a one hot vector to identify a sound event type of the target sound event among a predetermined set of sound event types, such as the set of target classes 106 shown in FIG. 1A.

At step 708, the method 700 includes processing the first digital representation 114 and the second digital representation 116 by the neural network 118 to determine the localization information 120. The localization information 120 includes a direction of arrival of the target sound event from its origin toward the acoustic sensor and a distance between the origin of the target sound event and the acoustic sensor. The neural network 118 is trained for considering sound events of the plurality of sound events 102 other than the identified target sound event 124 as directional interferences 104. The directional interferences 104 are identified by combining the second digital representation 116 of the identified target sound event 124 with at least one intermediate output received after processing the first digital representation 114 with the neural network 118.

At step 710, the method 700 includes outputting the localization information. The output may be used for further processing in applications such as audio processing applications. The method terminates at step 712.

Figure 8:
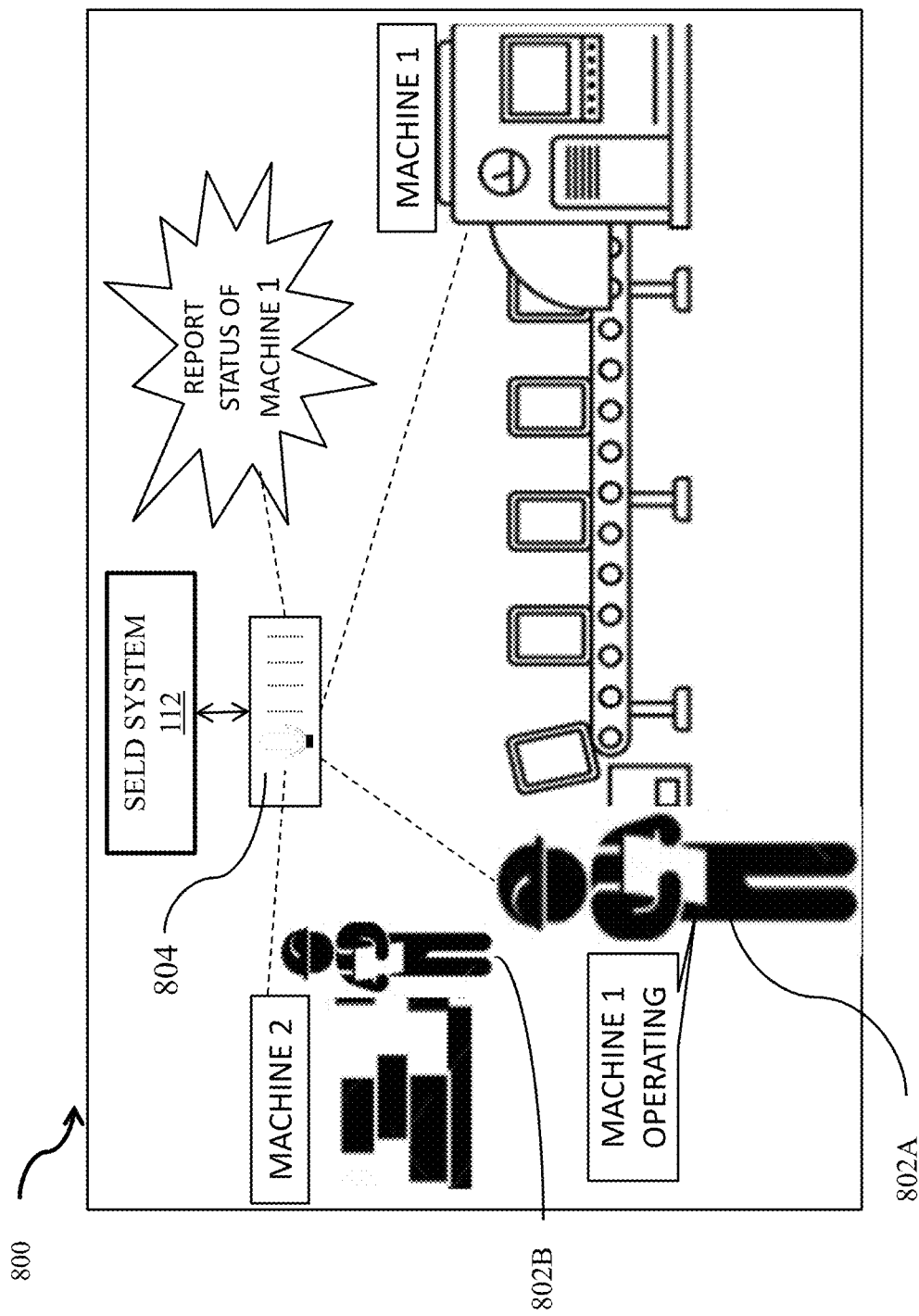
FIG. 8 shows a use case for estimating the DOA of a sound event, according to one example embodiment of the present disclosure.

FIG. 8 illustrates a use case 800 for estimating a localization information including the DOA of a sound event, according to some other example embodiments of the present disclosure. The use case 800 corresponds to a factory floor scene that includes one or more speakers, such as a speaker 802A and a speaker 802B. The factory floor has multiple sound events and noises due to operations of different industrial machineries. The factory floor is equipped with an audio device 804 for facilitating communication between a control operator of the factory floor (not shown) with the one or more speakers 802A and 802B in the factory floor. The audio device 804 is equipped with the SELD system 112.

In an illustrative example scenario, the audio device 804 is sending an audio command that is addressed to the person 802A managing the factory floor. The audio command states, "REPORT STATUS OF MACHINE 1". The speaker 802A utters "MACHINE 1 OPERATING". However, speech signals of the utterances of the speaker 802A is mixed with noises from the machine, noises from background and other utterances from the speaker 802B in the background. Such noises and reverberant signals are mitigated by the SELD system 112. The SELD system 112 identifies the target sound event and outputs the DOA of the target sound event. The output DOA is further used to identify the sound of the speaker 802A and neglect sounds of the other sources. The response from the speaker 802A is then transmitted back to the audio device 804 in a focused and targeted manner, leading to better audio control operations being performed on the factory floor scene depicted in FIG. 8.

Figure 9:
FIG. 9 shows another use case for identifying the target sound event and estimating the DOA of the target sound event, according to some example embodiments of the present disclosure.

FIG. 9 illustrates another use case 900 for identifying the target sound event and estimating direction of arrival of the target sound event, according to some example embodiments of the present disclosure. The use case 900 corresponds to an in-vehicle infotainment system 904. The in-vehicle infotainment system 904 is implemented in a vehicle, such as a manually operated vehicle, an automated vehicle, or a semi-automated vehicle. The vehicle is occupied by a plurality of persons, such as a person 902a, a person 902b and a person 902c. The in-vehicle infotainment system 904 is equipped with the SELD system 112. For instance, the in-vehicle infotainment system 904 is remotely connected to the SELD system 112 via a network. In some alternative example embodiments, the SELD system 112 is embedded within the in-vehicle infotainment system 904.

The in-vehicle infotainment system 904 also includes a microphone or multiple microphones to receive a mixture of acoustic signals. The mixture of acoustic signals includes speech signals from the persons 902a, 902b, and 902c as well as external noise signals, such as honking sound of other vehicles, and the like. In the case, the person 902a is talking to the person 902c, and the other person 902b is uttering/singing a sound in louder voice than the persons 902a, and 902c. The utterance from the person 902c intervenes the speech command of the person 902a, and 902c. For instance, the speech command of the person 902a is "PETROL TANK NEAR EMPTY" and the speech command of the person 902c is "LOOK FOR THE NEAREST PETROL PUMP". In such instance, the SELD system 112 processes the utterances of each of the person 902a, 902b, and 902c, and identifies that the target sound event belongs to the speech commands of the persons 902a and 902c. The SELD system 112 considers all the utterances except the utterances of person 902a, and 902c as directional interferences and accordingly outputs the DOA of the target sound event. The output DOA is further used to identify the sound of the person 902a and 902c and neglect sounds of the other sources.

Many modifications and other embodiments of the inventions set forth herein will come to mind to one skilled in the art to which these inventions pertain having the benefit of the teachings presented in the foregoing descriptions and the associated drawings. It is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

We claim:

1. A sound event localization and detection (SELD) system for localization of one or more target sound events, the SELD system comprising: at least one processor; and memory having instructions stored thereon that, when executed by the at least one processor, cause the SELD system to:
  collect a first digital representation of an acoustic mixture of sounds of a plurality of sound events sensed by an acoustic sensor;
  receive a second digital representation of a sound of a class corresponding to a target sound event in the acoustic mixture;
  input the second digital representation to one or multiple feature-invariant linear modulation (FiLM) blocks;
  combine outputs of the one or multiple FiLM blocks with the outputs of intermediate layers of the neural network;
  submit the combinations to next layers of the neural network;
  process the first digital representation and the second digital representation with a neural network trained to produce a localization information of the target sound event indicative of a location of an origin of the target sound event in the acoustic mixture with respect to a location of the acoustic sensor sensing the acoustic mixture, wherein the neural network comprises a class conditioned SELD network to determine the localization information, wherein the class conditioned SELD network comprises at least one FiLM block that is directed to one or more convolution blocks, wherein the at least one FiLM block and the one or more convolution blocks are trained to identify the target sound event and estimate the localization information; and
  output the localization information of the origin of the target sound event.

2. The SELD system of claim 1, wherein the target sound event is identified by the neural network by combining the second digital representation of the target sound event with at least some intermediate outputs of at least some layers of the neural network processing the first digital representation of the acoustic mixture.

3. The SELD system of claim 1, wherein the localization information includes one or a combination of: a direction of arrival of the target sound event from its origin toward the acoustic sensor and a distance between the origin of the target sound event and the acoustic sensor.

4. The SELD system of claim 1, wherein the second digital representation identifies multiple target sound events, and wherein the neural network is a multi-head neural network trained with a permutation invariant training to output different location information of different target sound events into different heads of the multi-head neural network.

5. The SELD system of claim 1, wherein the neural network identifies the target acoustic event interfered with other sounds in the acoustic mixture by combining encodings of the second digital representation of the target sound event with at least some intermediate outputs of at least some layers of the neural network processing the first digital representation of the acoustic mixture.

6. The SELD system of claim 1, wherein the neural network processes the first digital representation with an attention placing the first digital representation in a context of embeddings of the second digital representation.

7. The SELD system of claim 1, wherein each of the FiLM blocks comprises an embedding layer, a linear layer, a dropout layer, a tile layer, and an output layer.

8. The SELD system of claim 1, wherein each of the one or more convolution blocks comprises a 2-dimensional convolution layer, a batch normalization layer, a rectified linear activation function (ReLU), a max pooling layer, and a dropout layer.

9. The SELD system of claim 1, wherein the neural network is a convolutional recurrent neural network.

10. The SELD system of claim 1, wherein the second digital representation comprises a one-hot vector indicative of a sound event type of the target sound event among a predetermined set of sound event types.

11. The SELD system of claim 1, wherein the second digital representation includes one or more exemplar waveform representations indicative of one or a combination of spatial characteristics, spectral characteristics, or class information of the target sound event.

12. The SELD system of claim 11, wherein the neural network jointly processes an embedding vector with the first digital representation of the acoustic mixture to produce the localization information, wherein the embedding vector is a transformed one-hot vector.

13. The SELD system of claim 12, wherein the neural network jointly processes the embedding vector with first digital representation of the acoustic mixture using one or multiple feature-invariant linear modulation (FiLM) blocks.

14. The SELD system of claim 1, wherein the first digital representation includes a waveform representation of spatial and spectral features of the acoustic mixture.

15. The SELD system of claim 1, wherein the acoustic sensor includes a plurality of microphones arranged in a predetermined pattern operatively connected to the SELD via a wired or a wireless communication channel.

16. A method for localization of a target sound event, the method comprising:
  collecting a first digital representation of an acoustic mixture of sounds of a plurality of sound events sensed by an acoustic sensor;
  receiving a second digital representation of a sound corresponding to a target sound event;
  inputting the second digital representation to one or multiple feature-invariant linear modulation (FiLM) blocks;
  combining outputs of the one or multiple FiLM blocks with the outputs of intermediate layers of the neural network;
  submitting the combinations to next layers of the neural network;
  processing the first digital representation and the second digital representation with a neural network trained to produce a localization information indicative of a location of an origin of the target sound event with respect to a location of the acoustic sensor, wherein the neural network identifies the target sound event interfered with other sounds in the acoustic mixture, wherein the neural network comprises a class conditioned SELD network to determine the localization information, wherein the class conditioned SELD network comprises at least one FiLM block that is directed to one or more convolution blocks, wherein the at least one FiLM block and the one or more convolution blocks are trained to identify the target sound event and estimate the localization information; and
  outputting the localization information of the origin of the target sound event.

17. The method of claim 16, wherein the target sound event is identified by the neural network by combining the second digital representation of the target sound event with at least some intermediate outputs of at least some layers of the neural network processing the first digital representation of the acoustic mixture.

18. The method of claim 16, wherein the second digital representation includes one or more exemplar waveform representations indicative of one or a combination of spatial characteristics, spectral characteristics, or class information of the target sound event.

19. A sound event localization and detection (SELD) system for localization of one or more target sound events, the SELD system comprising: at least one processor; and memory having instructions stored thereon that, when executed by the at least one processor, cause the SELD system to:
  collect a first digital representation of an acoustic mixture of sounds of a plurality of sound events sensed by an acoustic sensor;
  receive a second digital representation of a sound of a class corresponding to a target sound event in the acoustic mixture;
  input the second digital representation to one or multiple feature-invariant linear modulation (FiLM) blocks;
  combine outputs of the one or multiple FiLM blocks with the outputs of intermediate layers of the neural network;
  submit the combinations to next layers of the neural network;
  process the first digital representation and the second digital representation with a neural network trained to produce a localization information of the target sound event indicative of a location of an origin of the target sound event in the acoustic mixture with respect to a location of the acoustic sensor sensing the acoustic mixture, wherein the neural network comprises a class conditioned SELD network to determine the localization information, wherein the class conditioned SELD network comprises at least one FiLM block that is directed to one or more convolution blocks, wherein the at least one FiLM block and the one or more convolution blocks are trained to identify the target sound event and estimate the localization information, wherein each of the FiLM blocks comprises an embedding layer, a linear layer, a dropout layer, a tile layer, and an output layer; and
  output the localization information of the origin of the target sound event.

* * * * *